United States Patent [19]
Durham

[11] Patent Number: 4,940,340
[45] Date of Patent: Jul. 10, 1990

[54] SEALED BALL BEARING MECHANISM

[76] Inventor: Roger O. Durham, 1370 Thompson Ave., Glendale, Calif. 91201

[21] Appl. No.: 462,762
[22] Filed: Jan. 10, 1990
[51] Int. Cl.<sup>5</sup> ............................................... F16C 33/78
[52] U.S. Cl. ...................................... 384/482; 277/95
[58] Field of Search ............... 384/482, 140, 584, 541, 384/537; 277/95

[56] References Cited
U.S. PATENT DOCUMENTS 3,881,789  5/1975  Kornylak ............................. 384/482
4,362,344 12/1982  Lederman ............................ 384/482
4,808,012  2/1989  Otto ..................................... 277/95

Primary Examiner—Lenard A. Footland

[57] ABSTRACT

A bearing seal device seals the end of a ball bearing mechanism having an inner race engaging a cylindrical shaft, a plurality of balls, and an outer race. A flat elastic sealing ring abuts the inner race, which is inset, and bears against a sealing surface of the outer race. A circumferential seal engages and forms a seal on the shaft and abuts and forms a seal with the sealing ring. A bias means presses the circumferential seal against the sealing ring, which is deformed into a cup shape, and forms a seal with the sealing surface of the outer race.

3 Claims, 1 Drawing Sheet

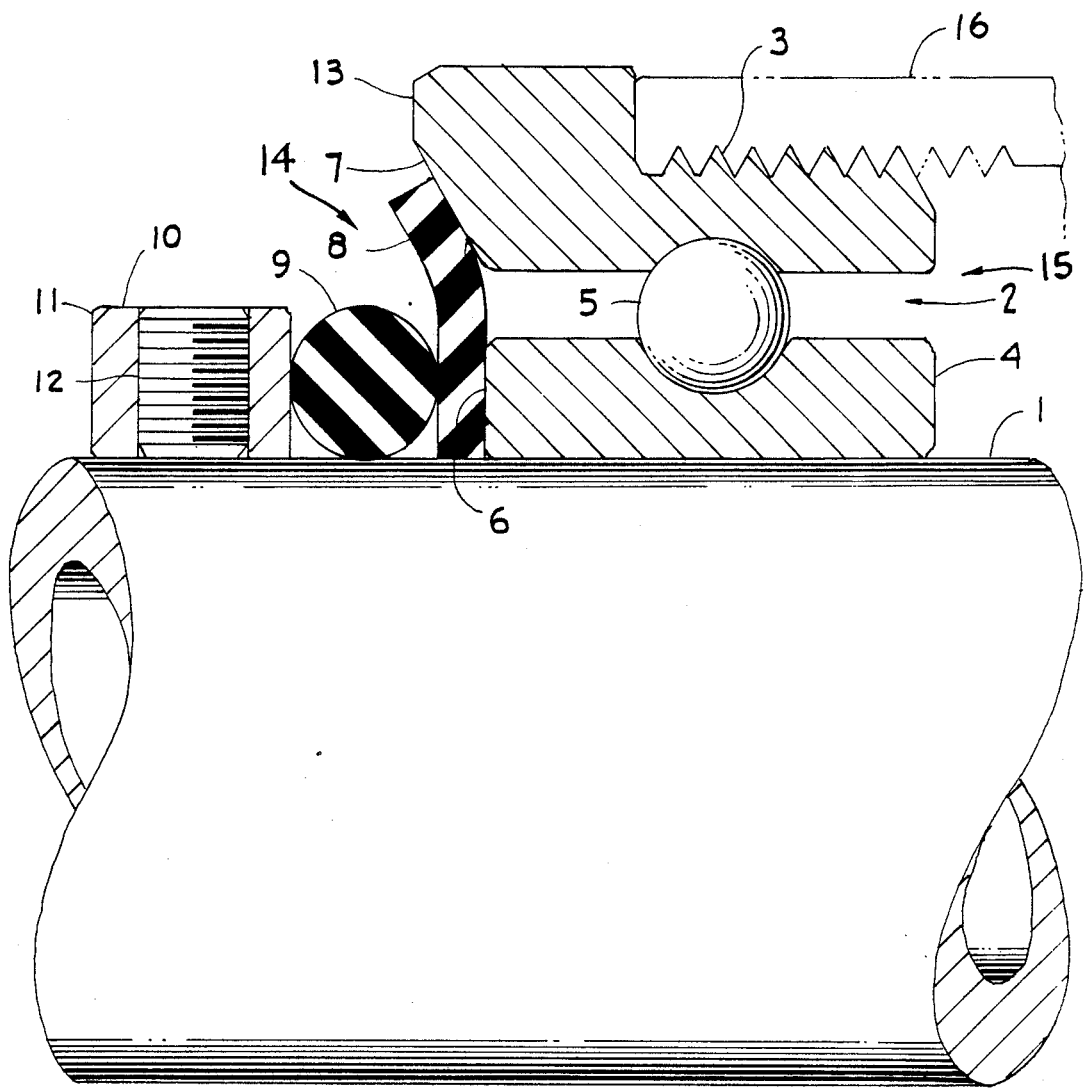

SEALED BALL BEARING MECHANISM

BACKGROUND OF THE INVENTION

This invention pertains to the sealing of ball bearings, to prevent water or other contaminants from entering the area of the balls and ball races.

In installations where a ball bearing has an inner race engaging a shaft, a plurality of balls, and an outer race engaging a housing, there is often need to form a seal between the shaft and the outer race.

In the past, a wide variety of molded elastic seals have been used to seal such bearings. Usually, they have been pressed into bores of the outer race, or into bores of a housing, and an elastic lip has been biased against the shaft, forming a seal on the shaft.

The molds for such seals require accurate and expensive die work to produce. In producing the seals themselves, elastic must be injected into dies using expensive machinery. Also, such seals often require metal inserts, which also must be manufactured.

Each size of such seals must be separately manufactured, distributed and stored. Each seal is, in effect, a separate product of its own. Thousands of different seals have been produced, requiring a vast expense for production and tooling.

Usually, such seals require special mandrels for installing them, and often special removal tools are needed to get them out.

The bearing seal of this invention provides solutions to most of these problems:
1. The sealing device is composed of very simple and readily available parts:
   (a) An neoprene O-ring is used as a circumferential seal. Such O-rings are available at many hardware stores.
   (b) A sealing ring is cut from flat, elastic coated belting. Such belting comes in flat sheets, and is usually available at hardware stores as well. In an emergency, a sealing ring could be cut out with scissors. Alternately, a molded cup-shaped sealing ring could be used.
2. Since O-rings are readily available, only the flat sealing rings would need to be produced, stored, and carried by dealers.
3. No installation or removal tools are required.

SUMMARY OF THE INVENTION

According to the invention, a sealed ball bearing mechanism is comprised of ball bearing mechanism and a bearing seal device.

The ball bearing mechanism includes an outer race, a plurality of balls, and an inner race for engaging a cylindrical shaft. A seal-end face of the inner race is inset from the seal-end face of the outer race. The outer race has a sealing surface adjoining the seal-end face.

The bearing seal device comprises a flat sealing ring, of elastic material, such as neoprene coated belting, an elastic circumferential seal, such as a rubber o-ring, and a bias device. The flat sealing ring is installed over the shaft and is held against the seal-end face of the inner race by the circumferential seal which is stretched over the shaft, and forms a seal therewith. The circumferential seal is backed up by a bias means, such as a spacer or set collar, such that the circumferential seal presses against, and forms a seal with, the flat sealing ring. The flat sealing ring is deformed into a cup shape by contact with the sealing surface of the outer race, and forms a seal therewith. Thus, sealing is accomplished using two simple sealing devices, instead of an expensive molded seal.

The objects of the invention include:
1. To provide a seal consisting of simple parts.
2. To provide a seal which can be installed or removed without any tools.
3. To provide a seal which can be made without expensive dies or molding machines.

BRIEF DESCRIPTION OF THE DRAWING

The drawing shows a partial section through a sealed ball bearing mechanism according to the invention.

DETAILED DESCRIPTION

A sealed ball bearing mechanism 2 is comprised of a bearing seal device 14 and a ball bearing mechanism 15.

Said sealed ball bearing mechanism 2 includes an outer race 3, formed for engagement with a housing, an inner race 4, formed for engagement with a cylindrical shaft 1, and a plurality of balls 5. Said inner race 4 has a seal-end face 6 against which bears a flexible sealing ring 8, made of elastic material. An elastic circumferential seal 9 is formed for engagement with, and for forming a seal with, said cylindrical shaft 1. Said elastic circumferential seal 9 abutts and forms a seal with said sealing ring 8. Said elastic circumferential seal 9 is pressed against said sealing ring 8 by a bias means 10 formed for engagement with said shaft 1. Said bias means 10 is shown to comprise a set collar 11 and a set screw 12.

Said bearing seal device 14 comprises said elastic sealing ring 8, said circumferential seal 9, and said bias means 10.

Said ball bearing mechanism 15 includes said outer race 3, said inner race 4, and said plurality of balls 5.

The periphery of said sealing ring 8 bears against and forms a seal with a sealing surface 7 formed adjoining a seal-end face 13 of said outer race 3. Said seal-end face 6 of said inner race 4 is inset from said seal-end face 13 of said outer race 3, in order to deform the sealing ring 8 into a cup shape and to develop forcible contact between said sealing ring 8 and said sealing surface 7.

MODE OF OPERATION

The circumferential seal 9 seals on said cylindrical shaft 1 and forms a seal with said sealing ring 8. Said circumferential seal 9 is pressed against said sealing ring 8 by said bias means 10. The periphery of said sealing ring 8 bears against the sealing surface 7 of said outer race 3, and forms a seal therewith.

Where an O-ring is shown as the circumferential seal, such a circumferential seal could equally well be formed by other means.

Where the sealing ring is shown as a flat member, it could alternately be a molded part. Said circumferential seal 9 and said sealing ring 8 could be molded together as one unit. Where the sealing surface of the outer race is shown to be conical, it could equally well be radiussed or chamfered. Where the bias means is shown to be a set collar, one or more backed-up washers or spacers would suffice equally.

Such minor variations from the bearing seal device shown are anticipated, and are within the scope of this invention.

I claim:

1. A bearing seal device for a ball bearing mechanism, said ball bearing mechanism including; an outer race formed for engagement with a housing, said outer race having a seal-end face and a sealing surface adjoining said seal-end face, an inner race formed for engagement with a cylindrical shaft, said inner race having a seal-end face which is inset from said seal-end face of said outer race, and a plurality of balls, said bearing seal device comprising;
   (a) a flexible sealing ring abutting said seal-end face of said inner race and bearing against said sealing surface of said outer race;
   (b) an elastic circumferential seal formed for engagement with, and for forming a seal with, said cylindrical shaft, and forming a seal with said elastic sealing ring;
   (c) bias means for engagement with said cylindrical shaft, said bias means adapted for pressing against said circumferential seal, whereby said sealing ring is deformed into a cup shape by contact with said sealing surface of said outer race.

2. A ball bearing mechanism for use with a bearing seal device, said bearing seal device comprising; a flexible elastic sealing ring, a circumferential seal, and a bias means, said ball bearing mechanism including;
   (a) an outer race formed for engagement with a housing, said outer race including a seal-end face and a sealing surface adjoining said seal-end face, said sealing surface formed for bearing against said flexible sealing ring;
   (b) an inner race formed for engagement with a cylindrical shaft, said inner race having a seal-end face for abutting said sealing ring, said seal-end face inset from saied seal-end face of said outer race;
   (c) a plurality of balls disposed between said inner and said outer races;
whereby seals are formed between said circumferential seal and said shaft, between said circumferential seal and said sealing ring, and between said sealing ring and said sealing surface of said outer race.

3. A sealed ball bearing mechanism, said sealed ball bearing mechanism comprising; a ball bearing mechanism including inner and outer races and a plurality of balls, said inner race formed for engagement with a cylindrical shaft, said inner race having a seal-end face abutting an elastic sealing ring, said outer race formed for engagement with a housing, said outer race having a seal-end face and a sealing surface adjoining said seal-end face, said sealing surface bearing against said sealing ring; a circumferential seal formed for engagement with said cylindrical shaft, said circumferential seal abutting said sealing ring; and a bias means formed for engagement with said shaft, said bias means abutting and pressing against said circumferential seal, whereby seals are formed between said circumferential seal and said shaft, between said circumferential seal and said sealing rings, and between said sealing ring and said sealing surface of said outer race.

* * * * *